UNITED STATES PATENT OFFICE.

AUGUSTE LUMIÈRE AND LOUIS LUMIÈRE, OF LYONS, FRANCE.

PROCESS OF MAKING PERSULFATE OF SODIUM.

SPECIFICATION forming part of Letters Patent No. 659,820, dated October 16, 1900.

Application filed January 31, 1900. Serial No. 3,497. (No specimens.)

*To all whom it may concern:*

Be it known that we, AUGUSTE LUMIÈRE and LOUIS LUMIÈRE, citizens of France, residing at Lyons, Monplaisir, France, have invented Improvements in the Manufacture of Persulfate of Sodium, of which the following is a full, clear, and exact description, and for which we have made application for patent in Great Britain, dated the 18th of December, 1899, and in France, dated the 21st of December, 1899.

In his study and experiments relative to persulfuric acid and the persulfates Marschall has not succeeded in isolating the persulfate of sodium. According to this author the electrolysis of solutions of sulfate of sodium would give persulfate, but the great solubility of this salt has prevented him from isolating it.

We have succeeded in preparing and isolating the persulfate of sodium by treating the persulfate of barium by the sulfate of sodium. The persulfate of barium is employed in saturated solution. With it is mixed sulfate of sodium finely pulverized or in saturated solution. When the mixture of the solutions or of the bodies in equimolecular proportions is finished, the sulfate of barium formed is eleminated by filtering and the process is finished by crystallization by natural evaporation in receptacles having an extensive surface. Small crystals of persulfate of sodium are soon deposited, which are collected, dried, and high dried at a rather low temperature. The evaporation and drying are effected more rapidly and more certainly *in vacuo*, but may nevertheless be effected at the ordinary pressure and in the open air. Again, the persulfate of barium in saturated solution can be treated with a corresponding quantity of sulfuric acid, the mixture being intensely cooled to obviate the decomposition of the persulfuric acid formed. There is then added, in small portions and avoiding any heating, either soda or carbonate or bicarbonate of soda, either in the solid state or in a state of solution. When the persulfuric acid is saturated, it is filtered to eliminate the sulfate of barium. Then it is evaporated as before described with respect to the preceding method.

The persulfate of sodium thus prepared is in the form of small anhydrous crystals very soluble in water, one hundred parts of water dissolving fifty-three parts of persulfate of sodium at 25°. It is applicable in industry as an oxidizer or decolorizer and as an antiseptic.

Having fully described our invention, what we claim, and desire to secure by Letters Patent, is—

The preparation of persulfate of sodium by means of persulfate of barium, by treating this body in very concentrated solution by the sulfate of sodium, after a preliminary treatment by sulfuric acid; the solutions of persulfate of sodium thus formed being filtered and evaporated at a slightly-elevated temperature, substantially as herein set forth.

In testimony whereof we affix our signatures in presence of two witnesses.

AUGUSTE LUMIÈRE.
LOUIS LUMIÈRE.

Witnesses:
 THOS. N. BROWNE,
 GASTON JEANNIAUR.